(12) United States Patent
Bossmann et al.

(10) Patent No.: US 7,454,893 B2
(45) Date of Patent: Nov. 25, 2008

(54) ELECTRO-THERMAL NANOPARTICLE GENERATOR

(76) Inventors: Stefan H. Bossmann, 4915 Lakewood Dr., Manhattan, KS (US) 66503; Norbert Bora, Kreuzlom A3, D-85276 Pfaffenhofen a.d. DLM (DE)

( * ) Notice: Subject to any disclaimer, the term of this patent is extended or adjusted under 35 U.S.C. 154(b) by 609 days.

(21) Appl. No.: 11/086,641

(22) Filed: Mar. 21, 2005

(65) Prior Publication Data

US 2005/0210859 A1    Sep. 29, 2005

(30) Foreign Application Priority Data

Mar. 23, 2004  (DE) .................. 10 2004 014 618

(51) Int. Cl.
*F03H 1/00* (2006.01)
(52) U.S. Cl. .......................... 60/202; 60/204
(58) Field of Classification Search ............. 60/203.1, 60/804, 39.37, 733, 737, 740, 746, 747, 748, 60/761, 764, 204, 202

See application file for complete search history.

(56) References Cited

U.S. PATENT DOCUMENTS

| | | | |
|---|---|---|---|
| 3,041,824 A | | 7/1962 | Berhman |
| 3,811,278 A | * | 5/1974 | Taylor et al. .................. 60/743 |
| 3,972,182 A | * | 8/1976 | Salvi ........................... 60/743 |
| 4,124,802 A | * | 11/1978 | Terasawa et al. .......... 250/492.2 |
| 4,216,652 A | * | 8/1980 | Herman et al. ................ 60/748 |
| 4,636,287 A | * | 1/1987 | Pike et al. .............. 204/157.22 |
| 5,170,623 A | | 12/1992 | Dailey et al. |
| 5,171,932 A | | 12/1992 | McElroy |
| 5,468,427 A | | 11/1995 | Stangle et al. |
| 5,515,681 A | * | 5/1996 | DeFreitas .................... 60/740 |
| 5,523,065 A | | 6/1996 | Stangle et al. |
| 5,628,180 A | * | 5/1997 | DeFreitas .................... 60/776 |
| 5,660,772 A | | 8/1997 | Stangle et al. |
| 5,660,773 A | | 8/1997 | Stangle et al. |
| 5,716,565 A | | 2/1998 | Stangle et al. |
| 5,752,381 A | | 5/1998 | Speller |
| 5,845,880 A | | 12/1998 | Petrosov et al. |
| 5,886,290 A | | 3/1999 | Lindblom et al. |
| 6,286,300 B1 | * | 9/2001 | Zelina et al. .................. 60/804 |

(Continued)

FOREIGN PATENT DOCUMENTS

DE    3874268 T2    3/1988

(Continued)

OTHER PUBLICATIONS

International Search Report and Written Opinion from International Application No. PCT/US2005/09578 having International Filing Date Mar. 21, 2005, 12 pgs.

*Primary Examiner*—William H Rodríguez
(74) *Attorney, Agent, or Firm*—Christie, Parker & Hale, LLP

(57) ABSTRACT

A thermo-chemical nanoparticle generator for the controlled production of nanoparticles, and a method of controllably producing nanoparticles are provided. The combustion of a carbon based propellant under the controlled variation of combustion parameters (temperature, pressure and stoichiometry) allows for the production of ionized nanoparticles of a defined mass. In addition, with the assistance of a high voltage generator a combined ionized gas-/solid particle plasma stream can be produced, which can accelerated in an acceleration tube to high emission velocities allowing for applications of the invention ranging from spacecraft propulsion to plasma welding.

49 Claims, 12 Drawing Sheets

U.S. PATENT DOCUMENTS

| | | |
|---|---|---|
| 6,293,090 B1 | 9/2001 | Olson |
| 6,334,302 B1 | 1/2002 | Chang-Diaz |
| 6,365,016 B1 | 4/2002 | Iacovangelo et al. |
| 6,437,325 B1 | 8/2002 | Reilly et al. |
| 6,649,907 B2 | 11/2003 | Ebeling et al. |
| 6,689,192 B1 | 2/2004 | Phillips et al. |
| 6,755,886 B2 | 6/2004 | Phillips et al. |
| 6,797,945 B2 | 9/2004 | Berggren et al. |
| 6,883,332 B2 * | 4/2005 | Steinthorsson et al. ........ 60/776 |
| 6,895,755 B2 * | 5/2005 | Steinthorsson et al. ........ 60/742 |
| 6,895,756 B2 * | 5/2005 | Schmotolocha et al. ....... 60/761 |
| 2004/0178530 A1 | 9/2004 | Yadav |
| 2004/0245085 A1 | 12/2004 | Srinivasan |
| 2005/0007001 A1 | 1/2005 | Imholt et al. |

FOREIGN PATENT DOCUMENTS

| | | |
|---|---|---|
| DE | 4311773 C2 | 4/1993 |
| DE | 19828704 A1 | 6/1998 |
| DE | 19948229 C1 | 5/2001 |

\* cited by examiner

# ELECTRO-THERMAL NANOPARTICLE GENERATOR

CROSS-REFERENCE TO RELATED APPLICATIONS

The current application claims priority to German Patent Application No. DE 102004014618, filed Mar. 23, 2004, the disclosure of which is incorporated herein by reference.

FIELD OF THE INVENTION

This invention generally relates to a device for producing ionized nanoparticles of a defined mass as well as a variable specific impulse.

BACKGROUND OF THE INVENTION

The production of ionized particles is well known from the literature, particularly in the field of electrostatic and electro-thermal propulsion systems for space applications.

For example, electrostatic devices follow the functional principle that a gaseous propellant is ionized with the aid of an ionization source. An ion extraction device produces a beam of positive ions out of the existing-plasma. A voltage control unit can be used to adjust the potential of the voltage between the shield electrode and the acceleration electrode to provide a level of variability to the impulse of the ions, but not the mass or nature of the ions produced.

Likewise, electro-thermal particle systems generate a hot exhaust gas by the combustion of a propellant inside a combustion system. This gas can then be partially ionized to form a plasma. Again, the superposition of an electric field can produce an additional variable impulse, but cannot change the mass or nature of the particles produced in the exhaust gas.

Numerous additional examples exist. Plasma accelerators, for example, follow the functional principle that a propellant gas (e.g., helium or xenon) is introduced into the acceleration chamber and, in a first step, (partially) ionized. The ionization can be carried out with the aid of helicon-antennas, microwave induction, radio frequency or electron bombardment. There is no macroscopic separation of electrons and ions. The plasma is accelerated with electric and magnetic fields. The magnetic field further serves to focus the ionized gas stream and produce an electron cyclotron resonance (ECR) or ion cyclotron resonance (ICR) movement. The electrons move in opposition to the ions. Due to the scattering of electrons with neutral gas atoms or molecules there is a secondary ionization reaction with leads to an increase in the total ionization of the plasma. A special development of a plasma propulsion system is the Hall-Thruster, which is characterized in e.g., U.S. Pat. No. 5,845,880.

There has also been quite a significant level of interest in providing systems which allow for a variable specific impulse from the generated particles. For example, in U.S. Pat. No. 6,334,302 a two stage accelerator is provided. In this system, a propellant (hydrogen, methane or ammonia) is introduced to a first system stage where it is ionized via a helicon antenna. The ionized gas forms a plasma that is then accelerated via an electrostatic field. The gas then enters a part of the propulsion chamber where it is further heated via superconducting magnets. This part of the propulsion system could be called ICR-chamber. A disadvantage of the disclosed plasma accelerator is the use of a propellant with a relatively small molecular mass. Therefore specific impulse and thrust can be varied only within narrow limits.

Likewise, U.S. Pat. No. 5,170,623 discloses a hybrid chemo-electrical propulsion system. Inside a combustion chamber a propellant is oxidized and expanded via a nozzle. Outside of the diffuser a coil is arranged. The hot partially ionized exhaust gas stream is superposed and accelerated by a magnetic induction field. The variable electromagnetic field which is induced by the coil leads to a further ionization. Ions become magnetically accelerated with a specific impulse between 800 and 2500 s. A disadvantage of this propulsion system is the separation of chemical reaction chamber and acceleration system inside the diffuser.

Despite the significant level of interest in ionized particle generators, no system has been designed that would allow for the variability of particle size and mass. Accordingly, a need exists for an improved particle generator for producing ionized nanoparticles of a defined mass as well as a variable specific impulse

SUMMARY OF THE INVENTION

The current invention is directed to a nanoparticle generator and method for producing ionized nanoparticles of a defined mass as well as a variable specific impulse.

In one embodiment, the nanoparticle generator and method of the current invention is capable of generating a variable thrust and specific impulse for flight propulsion systems.

In another embodiment, the nanoparticle generator and method of the current invention is capable of generating a variable plasma.

In yet another embodiment, the nanoparticle generator and method of the current invention is capable of generating a controlled particle emission for nanoparticle deposition.

In still another embodiment, the nanoparticle generator and method of the current invention is provided with means for the insertion of heavy metals into the particle stream.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1:
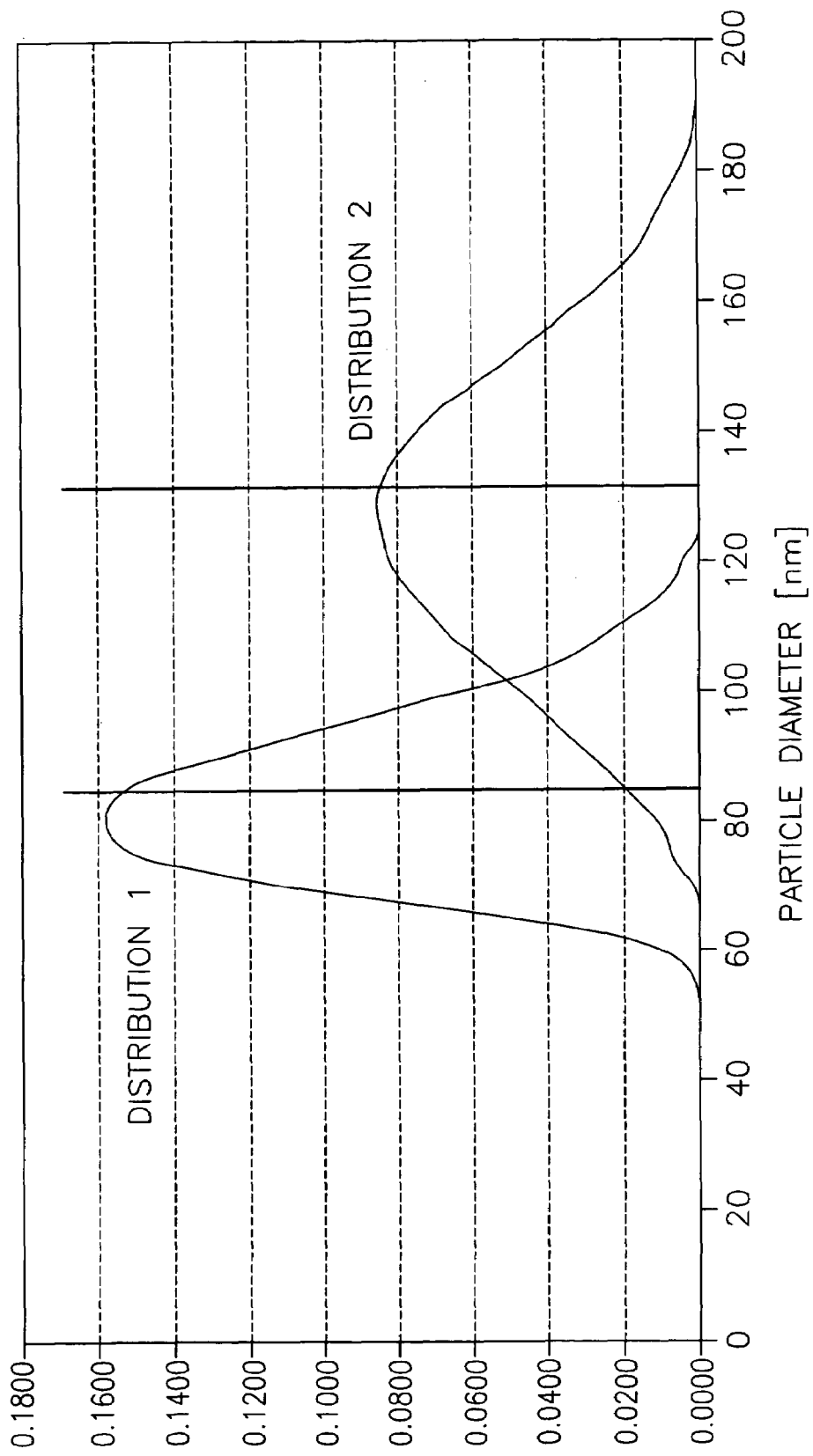
FIG. 1 shows a graphical depiction of a theoretical nanoparticle size distribution.

The current invention is directed generally to a device and method for the controlled generation of nanoparticles, and specifically to a nanoparticle generator capable of controlling the mass of the particles produced. It should be understood that although the classic definition for a nanoparticle is a particle possessing a diameter, which is smaller than or equal to 100 nm, the nanoparticle particles produced by and in accordance with the current invention can have diameters that are larger than this standard definition by at least an order of magnitude.

The nanoparticle generator of the current invention allows for the production of a combined gas-solid particle stream with a variable mass of solid particles from at least one fuel. The nature of the charged nanoparticles and the fuel are not essential to the present invention. For example, in one embodiment the nanoparticle generator of the current invention is designed to produce nanoparticles comprising black carbon/soot. Although the terms "soot", "carbon black" and "nanoparticles" are used conterminously herein, it should be understood that other types of nanoparticles may be produced.

Black carbon/soot is formed in a combustion process where hydrocarbon compounds or a mixture of hydrocarbon compounds is oxidized at substoichiometric conditions. Nanoparticles produced in a combustion process, such as by the burning of hydrocarbons, are generated in the temperature range of about 1000 K to 2500 K. The average time interval for the formation of nanoparticles of soot is a few milliseconds. During this time period the formation of solid nanoparticles with more than $10^5$ amu (atomic mass unit) takes place out of hydrocarbon compounds with a molecular mass of less than 100 amu. Because of the release of hydrogen during combustion, nanoparticles produced by the device of the current invention have a lower hydrogen ratio when compared with the introduced fuel. Accordingly, several reactions must take place to lead to the contrary observations of particle growth and hydrogen loss.

The basic steps of nanoparticle formation may be summarized as follows:
1. Partial oxidation of the fuel;
2. Nucleation;
3. Growth of the nucleus and formation of a primary particle;
4. Coagulation and agglomeration; and
5. Further oxidation (if oxygen is available).

Partial Oxidation of the Fuel

The following describes in a short manner the stoichiometry or combustion reactions relevant to the controlled generation of black carbon/soot nanoparticles. In the embodiment described below, ethylene is used as an exemplary fuel to describe the reaction equations. Ethylene was chosen because it strongly tends, even at near stoichiometric conditions, to form particles. It should be understood that the nanoparticle generator of the current invention and the related method of forming an ionized nanoparticle stream is not limited to ethylene and similar stoichiometric equations could be generated for a wide-range of hydrocarbon fuels.

For any combustion reaction, the specific minimum amount of oxygen ($O_2$) needed is defined by the following equation:

$$O_{2,min} = \frac{1 \text{ mol } O_2}{x \text{ mol fuel}} \qquad (\text{Eq. 1})$$

where the stoichiometric combustion of ethylene leads to a minimum oxygen amount of:

$$O_{s,min} = \frac{3 \text{ mol } O_2(NTP)}{1 \text{ mol } C_2H_4(NTP)} \qquad (\text{Eq. 2})$$

The corresponding amount of air (which could be defined as a mixture of 21 Vol.-% of oxygen and 79 Vol.-% of nitrogen) is defined by the value $1_{min}$:

$$l_{min} = \frac{O_{s,min}}{0.21} \left[ \frac{\text{mol air}}{\text{mol } C_2H_4} \right] \qquad (\text{Eq. 3})$$

The ratio of actually loaded amount of air (1) to the minimum air demand ($1_{min}$) defines the air demand ratio λ:

$$\lambda = \frac{l}{l_{min}} \qquad (\text{Eq. 4})$$

Again, although the above equations are defined for ethylene, it should be understood that the same analysis may be applied to other fuels.

The precondition of the soot formation is a local, or alternatively, total lack of oxidizer. If oxygen as an oxidizer is used and hydrocarbon compounds are used as fuel, the theoretical soot formation limit can be calculated with a C:O ratio of 1. This ratio describes the complete combustion of the hydrocarbon compound and the formation of hydrogen and CO. In contrast to this theoretical value for complete combustion, in an incomplete combustion where $CO_2$ and $H_2O$ are formed, the soot formation ratio is C:O=0.5. If one takes only these theoretical values into account, then there would be no ability to control the mass distribution of the nanoparticles formed from the combustion of different hydrocarbon compounds. It has been found that neither of these worst case scenarios describe real flames in a satisfying manner.

Instead, the formation of the different chemical compounds that exist in the reaction zone of a flame can be described correctly only by considering a variety of reaction paths and reaction velocities. Although no comprehensive understanding exists about all of the different reaction mechanisms and reaction paths that lead to nanoparticle (soot) precursors during combustion, two temperature dependent pathways are known and can be exploited to provide controlled combustion.

At temperatures above 1800 K aromatic compounds formed during combustion decompose to form acetylene and vinyl-acetylene. These compounds in turn accumulate to form nanoparticle nuclei. This type of soot formation is called "indirect."

At temperatures below 1800 K aromatic compounds accumulate and form poly-aromatic compounds (PAK). The condensation of these PAKs directly forms soot. Accordingly, this mechanism is called "direct soot formation."

Nucleation

The process of nanoparticle nucleus formation covers the formation of the "smallest unit" in a new solid phase that is in contact with the gaseous phase. There are two models of nucleus formation: a) the PAK-model, and b) the ion-model The PAK-model describes the formation of ring structures starting from acetylene. In this model acetylene reacts with hydrogen to form $C_2H_3$ radicals. These radicals in turn react with a second acetylene molecule to form larger radicals. The most important steps in the PAK-model are the separation of hydrogen, the reaction of activated radicals, and the ring formation. Schematically it could be described as follows:

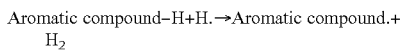

Aromatic compound–H+H.→Aromatic compound.+ $H_2$

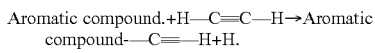

Aromatic compound.+H—C≡C—H→Aromatic compound-—C≡—H+H.

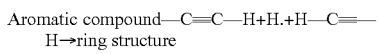

Aromatic compound—C≡C—H+H.+H—C≡— H→ring structure

The product of this reaction scheme can be reintegrated into the reaction chain. The large PAK-molecules formed via this reaction scheme are considered nanoparticle nuclei because they show an inner crystallite structure.

In contrast with the PAK-model, the ion-model describes nucleus formation through ionic reactions. The following reactions are considered to be elementary to this model:

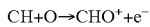

CH+O→CHO⁺+e⁻

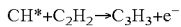

CH*+C₂H₂→C₃H₃+e⁻ where CH* is an excited radical.

The smaller ions e.g., $C_3H_3^+$ accumulate with hydrocarbon compounds having a conjugated double bond to form $C_zH_u$-ions. These $C_zH_u$ molecules in turn react with $C_xH_y$-molecules (e.g., acetylene) to form larger structures while separately hydrogen separation processes take place.

Growth of the Nucleus

The growth of the nucleus of the nanoparticles and the formation of primary particles after the nucleus formation has taken place occurs through the further accumulation of chemical compounds. The most common of these "accumulation compounds" are acetylene, poly acetylene and PAK, although many other simple hydrocarbon compounds could be implicated. The growth process itself takes place at activated places on the surface of the nanoparticle nucleus. The number of activated places is not dependent on the particle surface and is typically determined during the nucleus formation phase. In addition, these "activated places" are self-regenerating during the growth process, and may move about on the surface of the precursor.

Coagulation and Agglomeration

The coagulation of the precursors determines the dimension of the soot particles after nucleus formation and growth. The agglomeration itself has its origin in Van-der-Waals-forces. As particles are dehydrogenated their viscosity increases, and so solid particles are built. In the early stages of the coagulation process, primary particles have a nearly spherical shape.

Further Oxidation (If Oxygen is Available)

Although soot formation inherently involves combustion of hydrocarbon compounds, the nucleus formation processes discussed above are hindered or decelerated by uncontrolled oxidation reactions of O, OH or $O_2$ with hydrocarbon compounds. In short, combustion only produces nanoparticles if nucleus formation is faster than the competing oxidation processes. For example, if there is an excess of oxygen there might be a complete burnout of the nanoparticles in the exhaust gas of the flame. In contrast, in substoichiometric flames only OH-radicals play a significant role, and other oxygen species can be neglected. Accordingly, the oxidation process can be described and controlled via a model that is determined by the scattering frequency of OH-radicals with the particle surface.

In summary, nanoparticles can either be formed by the deagglomeration of large hydrocarbon particles, or through the reaction of suitable precursors, which combine or agglomerate and thus form nanoparticles. The present invention recognizes that by controlling the times and conditions of each of the steps described above, the particle size distribution of the nanoparticles can be controlled.

FIG. 1 shows two hypothetical particle distribution functions with a difference in the average diameter maximum of 50 nm. A particle distribution function with relatively small particles could be reached by the following combustion conditions:

Mean retention time inside the combustion chamber

High mass flow rates (equivalent to the mean retention time with respect of the external combustion chamber parameters—length and diameter)

High temperatures (T>1700 K)

Air demand number nearly stoichiometric (0.95<λ<1.0)

Particle distributions with higher particle diameters appear at:

Long retention time inside the combustion chamber

Low mass flow rates (equivalent to the long retention time with respect of the external combustion chamber parameters—length and diameter)

Moderate temperatures (1300 K<T<1700 K)

Low air demand number (λ<0.95)

Apparatus Detail

Figure 2:
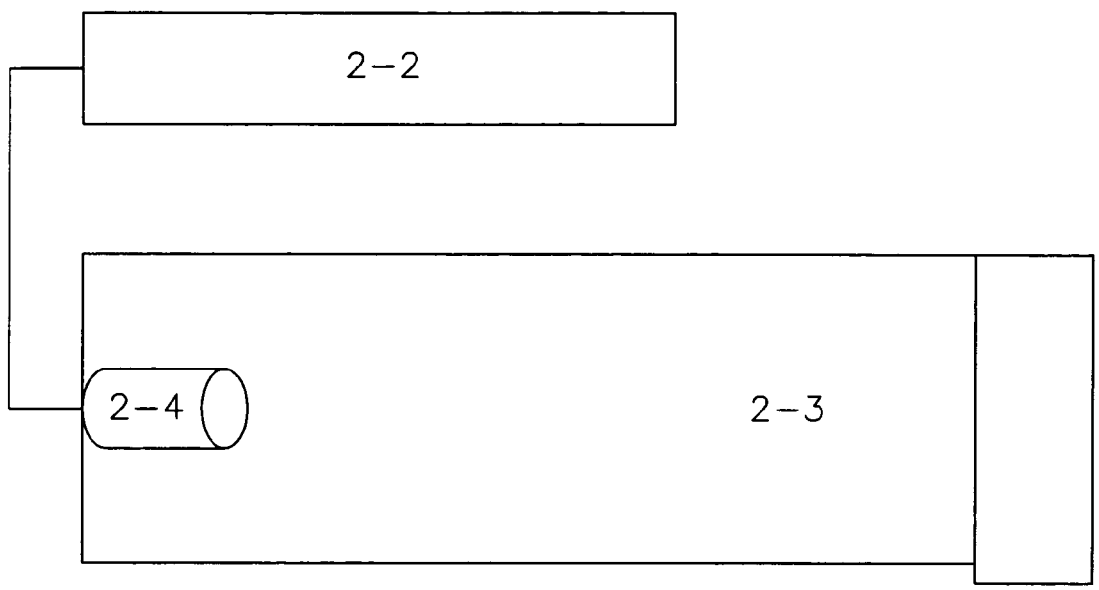
FIG. 2 shows a schematic of an embodiment of the nanoparticle generator of the current invention.

Although in one embodiment the current invention is directed to a method of controllably forming nanoparticles, the present invention is also directed to a nanoparticle generator generally. FIG. 2 shows a schematic of the principal features of a nanoparticle generator (2-1) in accordance with the present invention. As shown, the nanoparticle generator generally comprises a fuel source (2-2), a combustion chamber (2-3) and a combustion generator (2-4), such as a burner, disposed inside the combustion chamber and in fluid communication with the fuel source.

During operation, nanoparticles are formed inside the combustion chamber as a result of the controlled burn of a fuel stock by the combustion generator. To control the production rate and the fluid conditions for the particle diameter distribution, there are certain boundary conditions that the combustion chamber, as well as the combustion generator, must fulfill.

First, a suitable combustion generator must have a wide stability range. In one preferred embodiment the combustion generator is a burner. However, not all burners are satisfactory for controlled nanoparticle generation. For example, fully premixed burner configurations are not preferred in this respect. (Fully premixed burners, in which the fuel and oxidant are mixed completely in the apparatus prior to their entering the region where combustion is intended, are to be contrasted with partially premixed burners, where the fuel and only some of the oxidant are mixed prior to entering the combustion region.) In contrast, swirl burner configurations, in which a swirl is imparted to the fuel or oxidizer, or both, have a broader stability range, because the mixing of fuel and oxidizer is much higher. Two preferred swirl burner configurations are the turbulent diffusion configuration and the stabilized pressure plate-diffusion configuration. These types of burners show a broad stability range with narrow flames (i.e., Type I or Type II flames).

Figure 3:
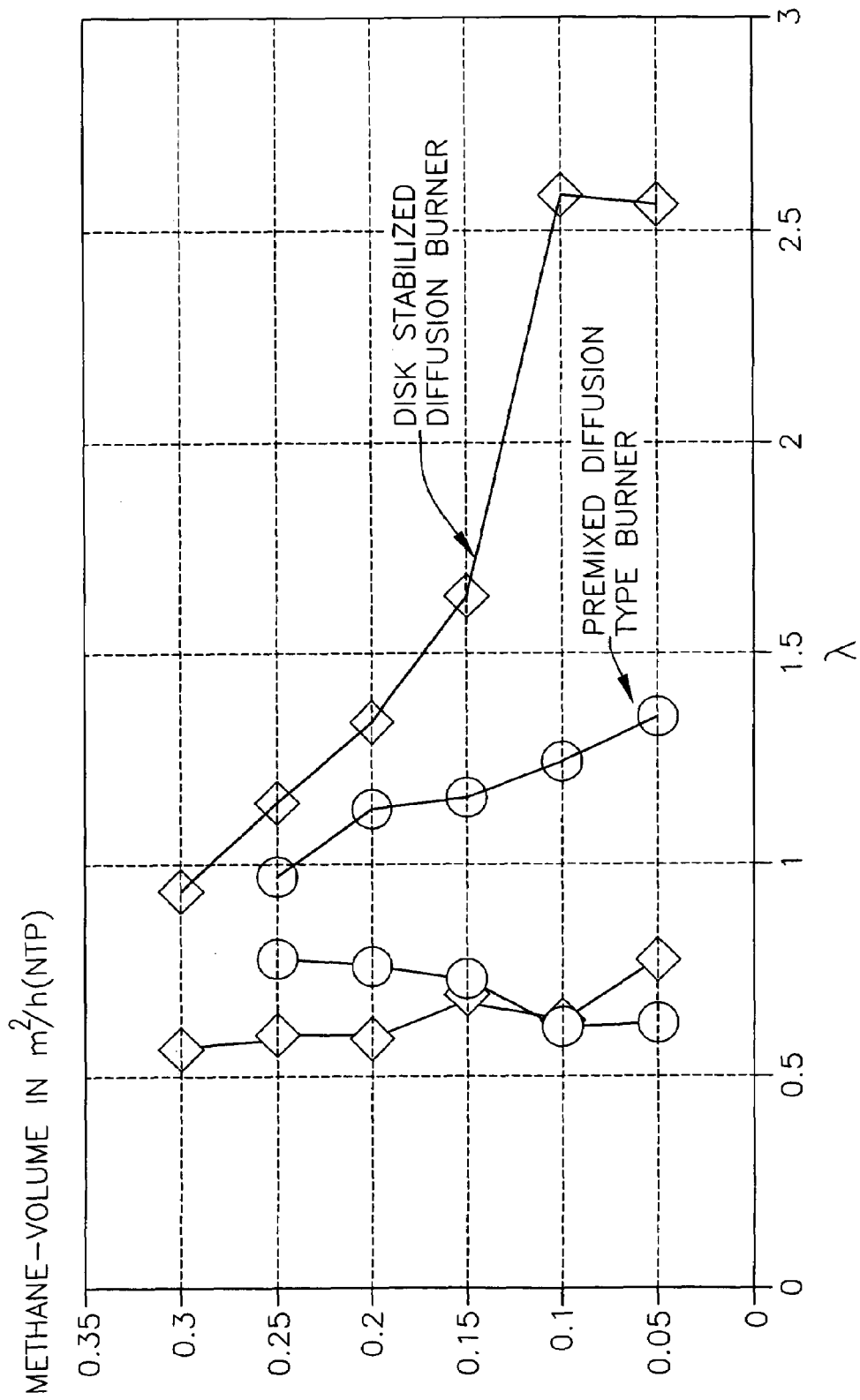
FIG. 3 shows a graphical depiction of stability borders of different burner types in accordance with the particle generator of the current invention operated with methane.

FIG. 3 shows a stability range graph of the combustion of methane with air for two different burner types (premixed burner and diffusion plate burner). The premixed burner shows an essentially restricted operation range, in comparison with the diffusion plate burner. With increasing fuel flow rate corresponding with an increasing thrust constant, as defined by Equation 5, below, the operation range is strongly limited, because at high flow rates there is a lift-off of the premixed flame.

$$v_{Fuel} \cdot -\frac{\partial m}{\partial t} \quad \text{(Eq. 5)}$$

The operation range of the diffusion plate burner is enlarged accordingly. Only at very low flow rates (laminar flame), i.e., operation range at substoichiometric conditions ($\lambda$<1) is the operation range of the plate burner more limited. The reason for this is an insufficient mixing of oxidizer and fuel near the plate. This leads to a jittering of the flame and therefore unstable burning conditions combined with a partial interrupt of the combustion.

Figure 5B:
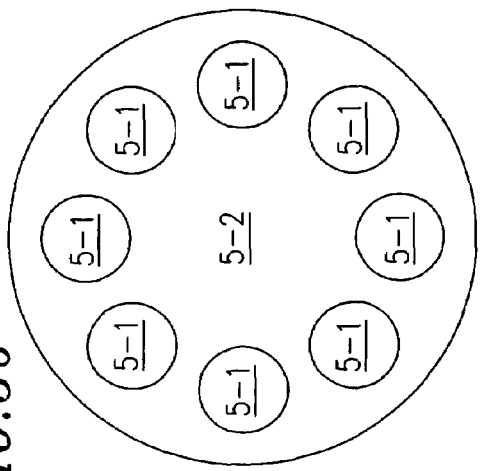
FIG. 5b shows a schematic of an exemplary embodiment of a circular arrangement of a burner inside the burner plate.

Although only a single burner device is shown in FIG. 2, it should be understood that multiple burners could be used. In such an embodiment, the arrangement of multiple burners inside the combustion chamber is also an important criterion. In one multi-burner embodiment of the invention, the burners are arranged in centric or circular arrangements as shown in FIG. 5a-c, and discussed in more detail below. However, it is also possible to arrange multiple combustion chambers each having a single burner symmetrically around a central axis.

The method of introducing the fuel and oxidizer into the combustion chamber is also important for the controlled formation of nanoparticles. For example, a liquid fuel may be introduced into the combustion chamber using a pressure atomizer. In this embodiment, the atomizer might be arranged such that the oxidizer and/or fuel gas stream is swirled within the combustion chamber using air blast nozzles. In another embodiment of the invention a double fuel injector is used to introduce heavier hydrocarbon compounds. In this embodiment, the burners produce a hot exhaust gas stream and another high molecular weight hydrocarbon compound, for example gasoline, diesel or oil, is introduced into the hot exhaust stream within the combustion chamber via the injection device. This high molecular hydro carbon compound is thermally decomposed by the exhaust gas and forms soot. An advantage of the application of a high molecular weight fuel, e.g., the insertion of hydrocarbon compounds or mixtures of hydrocarbon compounds, is that it allows the formation of nanoparticles with a high molecular mass and low ionization energy at substoichiometric combustion conditions. Using such a nanoparticle generator it is possible to form particles with a mass of several thousand amu (atomic mass unit).

Figure 4:
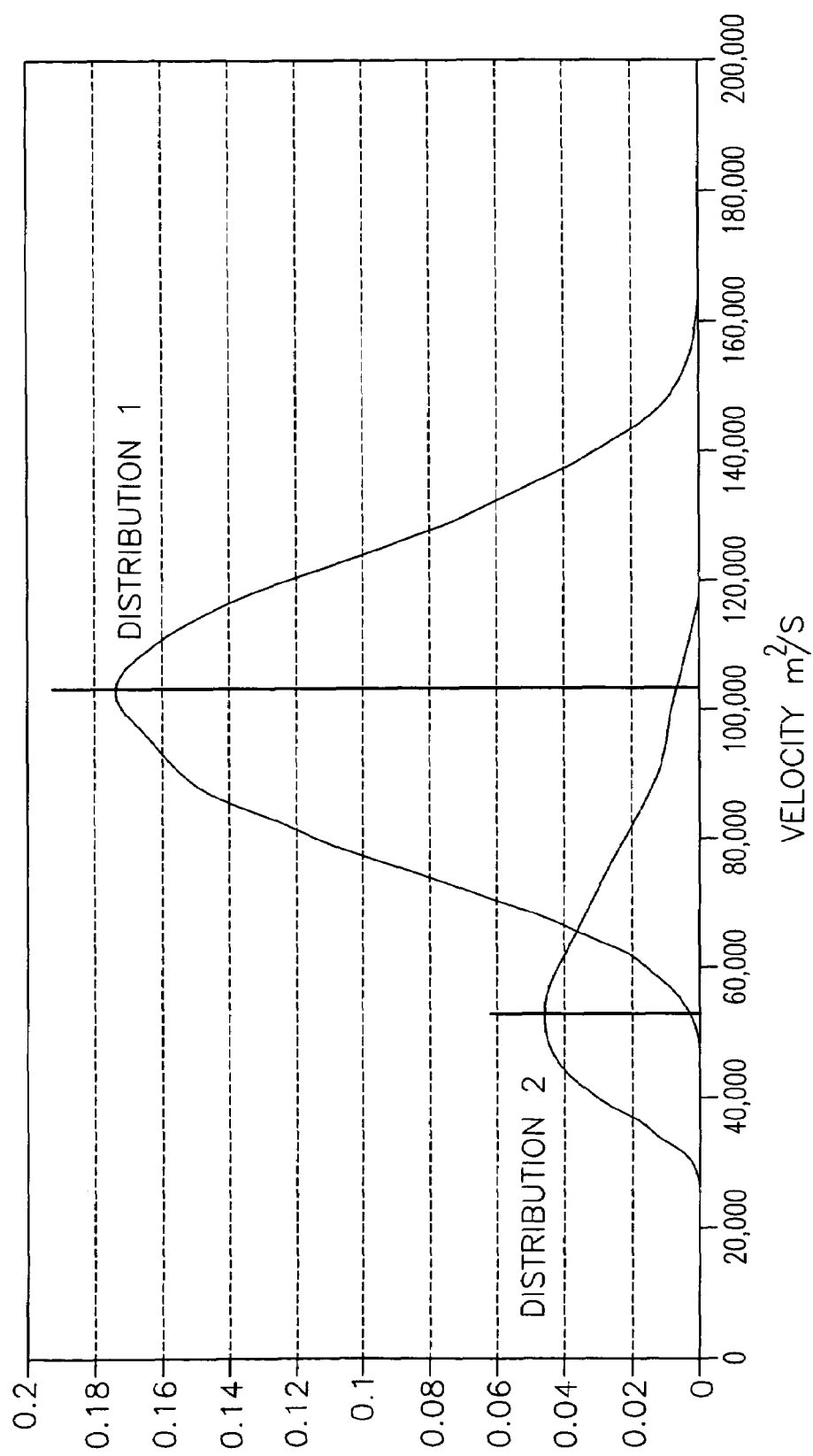
FIG. 4 shows a graphical depiction of a theoretical nanoparticle velocity distribution.

Although the above discussion has focused on the combustion portion on the invention, it is also important to recognize that the nanoparticles produced in the combustion chamber will usually possess an electric charge (most commonly one single positive electric charge) These charged nanoparticles of a defined diameter distribution function, which as discussed above, is a function of the combustion parameters, e.g., temperature and pressure in the combustion chamber, retention period and stoichiometry, can be accelerated in a static or dynamic (gradient varying field) external electric field to eject them from the combustion chamber in a controlled way. Indeed, it is the charged nature of the nanoparticles that lead to a number of possible applications for the current invention, including as a propulsion and plasma source. However, in applications where the controlled acceleration of these nanoparticles is of import, it will also be necessary to provide a controlled particle accelerator at the exhaust end of the combustion chamber. By controlling the electrical or magnetic field applied by the accelerator the velocity of the nanoparticles may also be controlled FIG. 4 shows the normalized velocity distribution function of single particles of the particle distribution shown in FIG. 1. The calculation of the velocity distribution is based on the boundary condition that each particle has no velocity at the beginning of the acceleration. Under real conditions there is a velocity depending on the mass flow inside the system. Another parameter in the calculation is the estimation that the velocity at the end of the acceleration channel is the same as if a particle moves inside the potential of a plate type condenser. However, the electrical energy could be transferred completely to the kinetic energy of the particle. A thermal movement and multiple charging of the particle is also neglected in this estimation. As shown, the average velocity of the particle stream is smaller for a particle distribution function of a higher average particle diameter, but this velocity can be boosted and adapted via a voltage increase at the accelerator.

In another preferred embodiment, the total ionization rate of the charged gas-solid-stream may be increased via an electric field with a field strength that is near or above the electrical breakdown field strength. The strength of the electric field is not limited to the above given magnitudes. For example, the field strength might be well below the breakdown voltage. A tunable high voltage generator may be provided to allow for the variance of the ionization level of the nanoparticles.

In embodiments where charged particles are desired, another consideration must be made. While the nanoparticles are controlled and accelerated out of the combustion chamber, negatively charged particles inside the combustion chamber, most commonly OH and free electrons, are in turn accelerated towards the chamber wall. To protect the chamber wall from damage due to these charged particles, a so called "chamber wall gas" may be introduced. This gas is designed to flow around the walls of the chamber to decelerate the negatively charged particles, or in a preferred embodiment react with them. Preferably gases with a high scattering cross section or combustion gases are used. In one exemplary embodiment hydrogen or methane are used as "chamber wall gases", because they react rapidly with $OH^-$-radicals.

Specific embodiments of the general nanoparticle generator discussed above are shown in FIGS. 5 to 7.

Figure 5D:
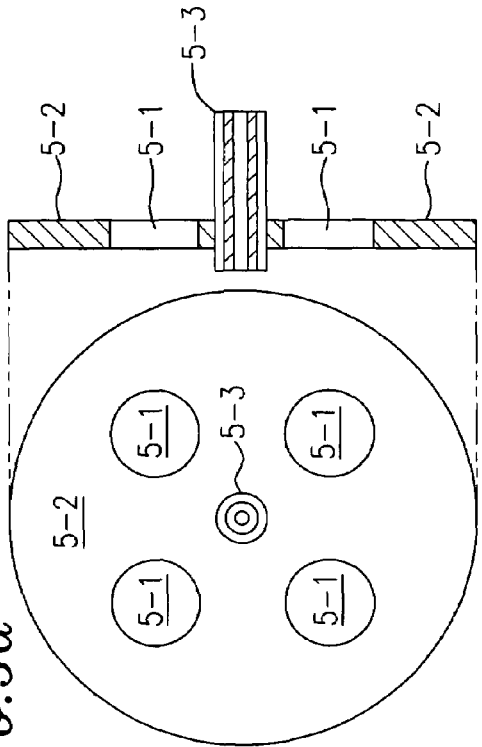
FIG. 5d shows a schematic of an exemplary embodiment of a burner inside the burner plate having an additional pyrolysis propellant doser.
Figure 5A:
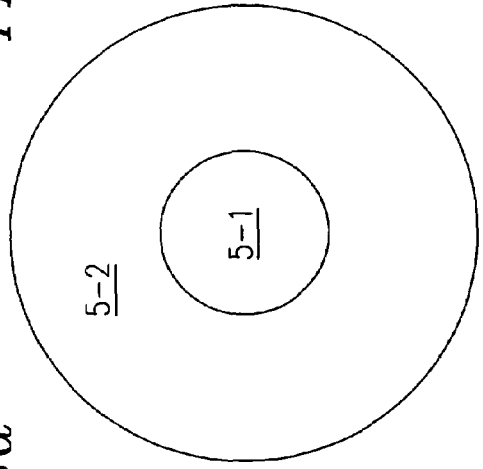
FIG. 5a shows a schematic of an exemplary embodiment of a centric arrangement of a burner inside the burner plate.
Figure 5C:
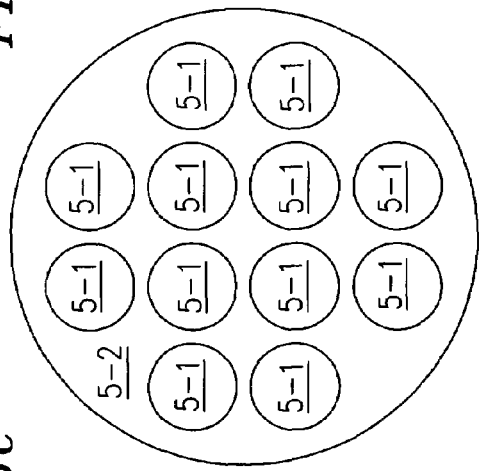
FIG. 5c shows a schematic of an exemplary embodiment of a planar arrangement of a burner inside the burner plate.

FIGS. 5a-d show various arrangements of burners (5-1) on the burner plate (5-2), and an alternative the injection device for a pyrolysis propellant (5-3) in accordance with the current invention. FIG. 5a shows a centric arrangement, and FIG. 5b a circular arrangement of the burners (5-1) on the burner plate. FIG. 5c shows a plane burner arrangement. FIG. 5d shows a circular burner arrangement of four burners (5-1) combined with a centric injection device (5-3) for a pyrolysis propellant. Principally, every hydrocarbon compound could be used as a pyrolysis propellant. In a preferred embodiment of this invention gasoline, diesel or fuel oil are used as a pyrolysis propellant. Not shown in FIG. 5d are the piping system for fuel, oxidizer and pyrolysis propellant. The outlet of the injection device is arranged inside the combustion chamber, because the pyrolysis propellant should not participate in the oxidation process. A thermal pyrolysis of the pyrolysis propellant leads to the formation of soot.

In such embodiments of the invention, soot, which is by its nature partially ionized (most commonly, one single positive charge), may, if desired, be accelerated towards the diffuser via an optional electric field which is applied to the combustion chamber and the acceleration channel. Additionally, as a result of the high temperatures inside the combustion chamber, further electrons are separated from the soot particles, which leads to an increase in the total ionization rate.

Figure 6A:
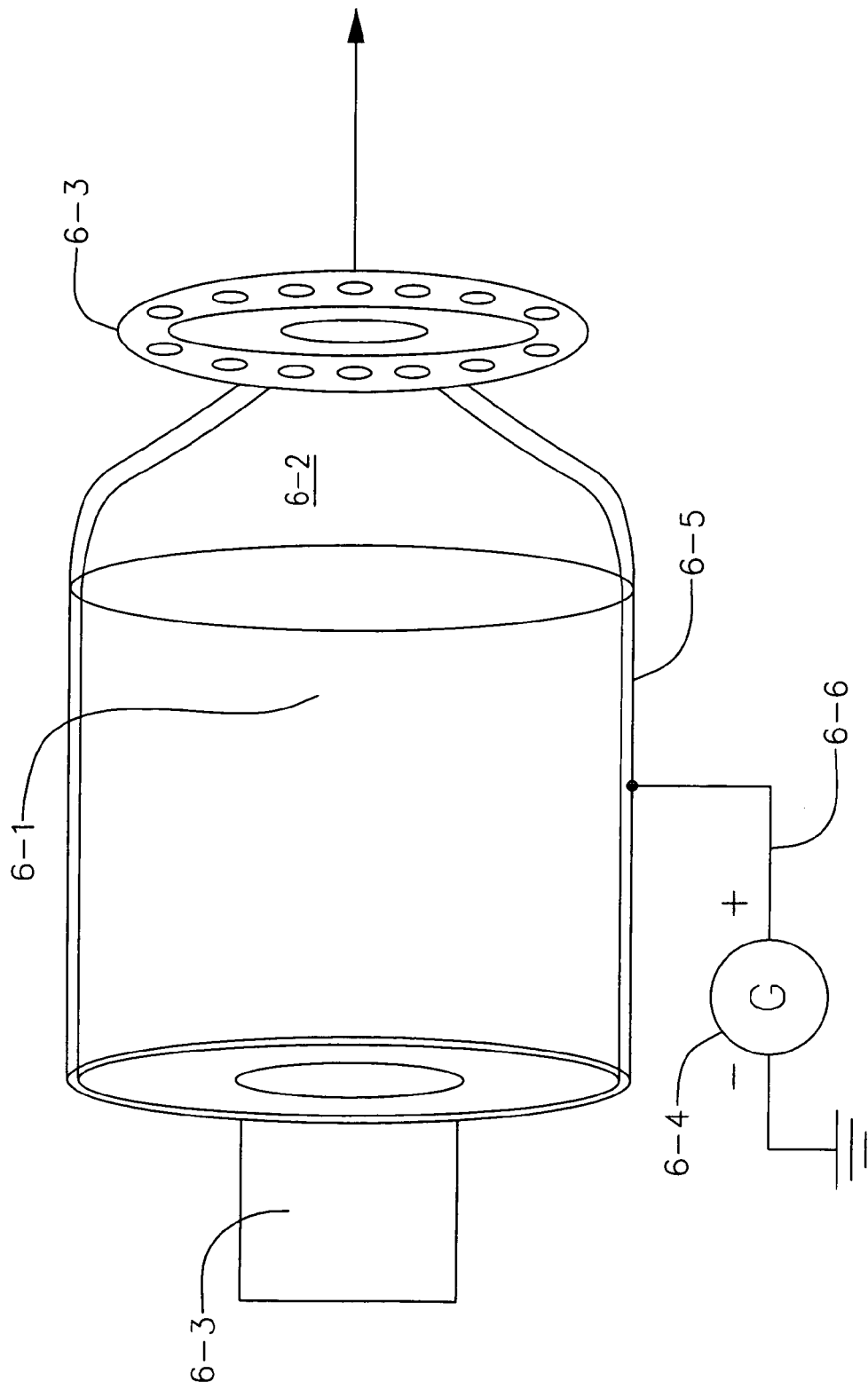
FIG. 6a shows a schematic of an exemplary configuration of a combustion chamber in accordance with the particle generator of the current invention.

FIG. 6a shows an exemplary embodiment having a cylindrical combustion chamber (6-1) with a tapered stricture (6-2) at its outlet. A burner (6-7) is attached to the chamber opposite the tapered structure (6-2) of the combustion chamber. The attachment can be made by welding a flange between the chamber housing and burner, or otherwise the burner might be screwed in the chamber wall via a thread. Any suitable burner type may be used, including a pressure burner or an air blast burner. The preferred embodiments of this invention are swirl burners, diffusion plate burners and partially premixed burners. Burners with a fully premixed fuel-oxidizer mixture are not preferred because of their strongly limited operational conditions. The principle construction features of these different burner types can be found in the text of Gunther, Rudolf: "Verbrennung und Feuerung", Berlin 1984, Springer Verlag, which is incorporated herein by reference.

Figure 6B:
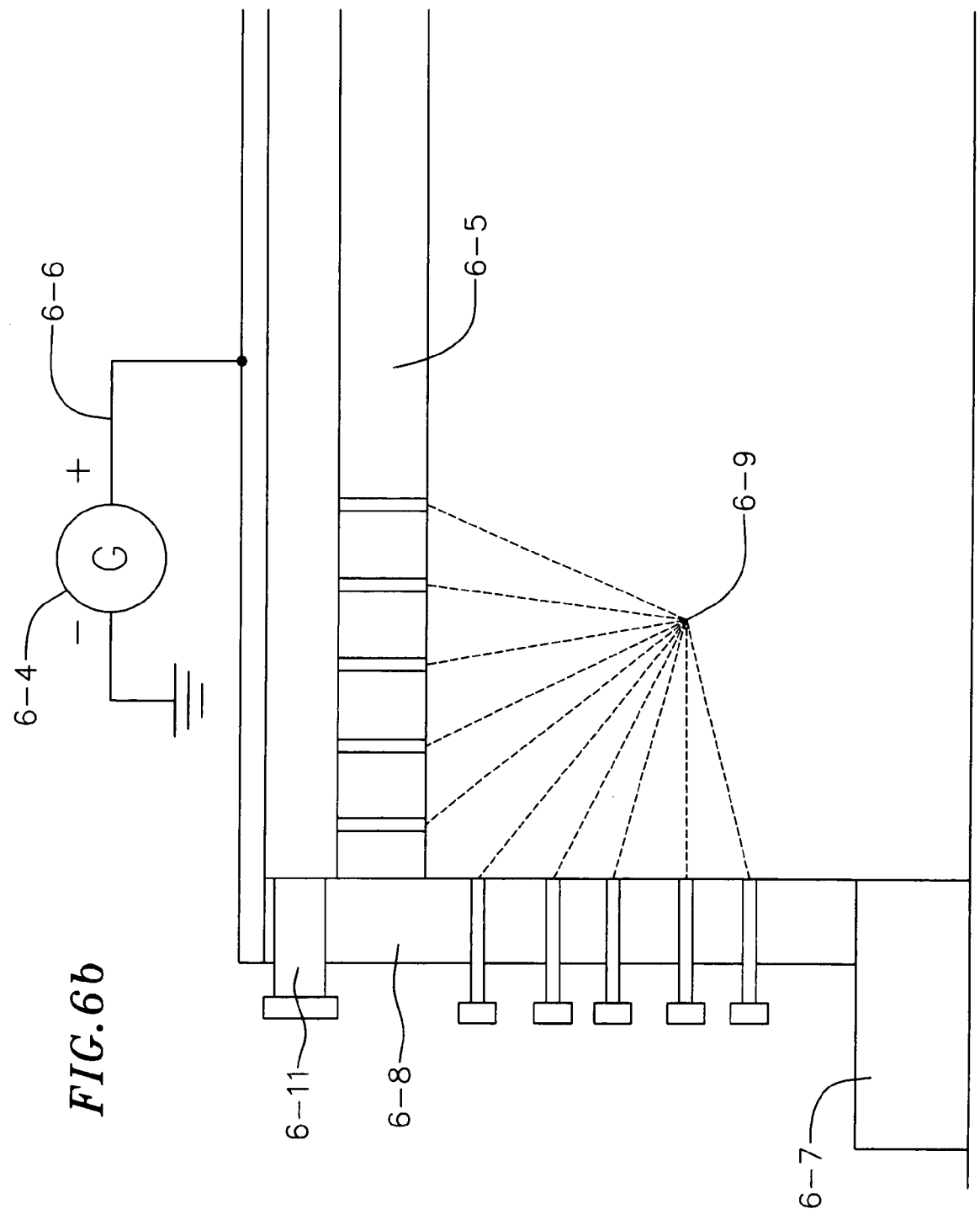
FIG. 6b shows a schematic of an exemplary configuration of a combustion chamber wall in accordance with the particle generator of the current invention.

FIG. 6b shows an alternative embodiment of the invention where a "chamber wall gas" is employed. In such an embodiment, area the combustion chamber wall (6-5) at the transition of the cylindrically combustion chamber (6-5) is provided with an adapter fitting where the burner is arranged. Holes (6-9) can be seen inside the chamber wall (6-5). A "chamber wall gas" is injected into the combustion chamber via those holes (6-9). The outlet of the holes (6-9) may take any suitable configuration, such as perpendicular to the chamber wall or at an angle to the wall surface. In other embodiments slots, cracks or tubes may be provided instead of holes. Arrangements where the "chamber wall gas" is injected in every single hole via ports (shown in FIG. 6b, port 6-8), or arrangements with a jacked duct (6-10) and a single port (6-11) are possible. The single-port arrangement has the advantage that the external wall gas stream operates to cool the chamber wall. Although any suitable gas may be used as the "chamber wall gas," it must be able to slow down the movement of the negatively charged particles, mainly electrons and OH$^-$ via impacts. Methane, hydrogen, nitrogen and noble gases, for example, may be used.

Figure 6C:
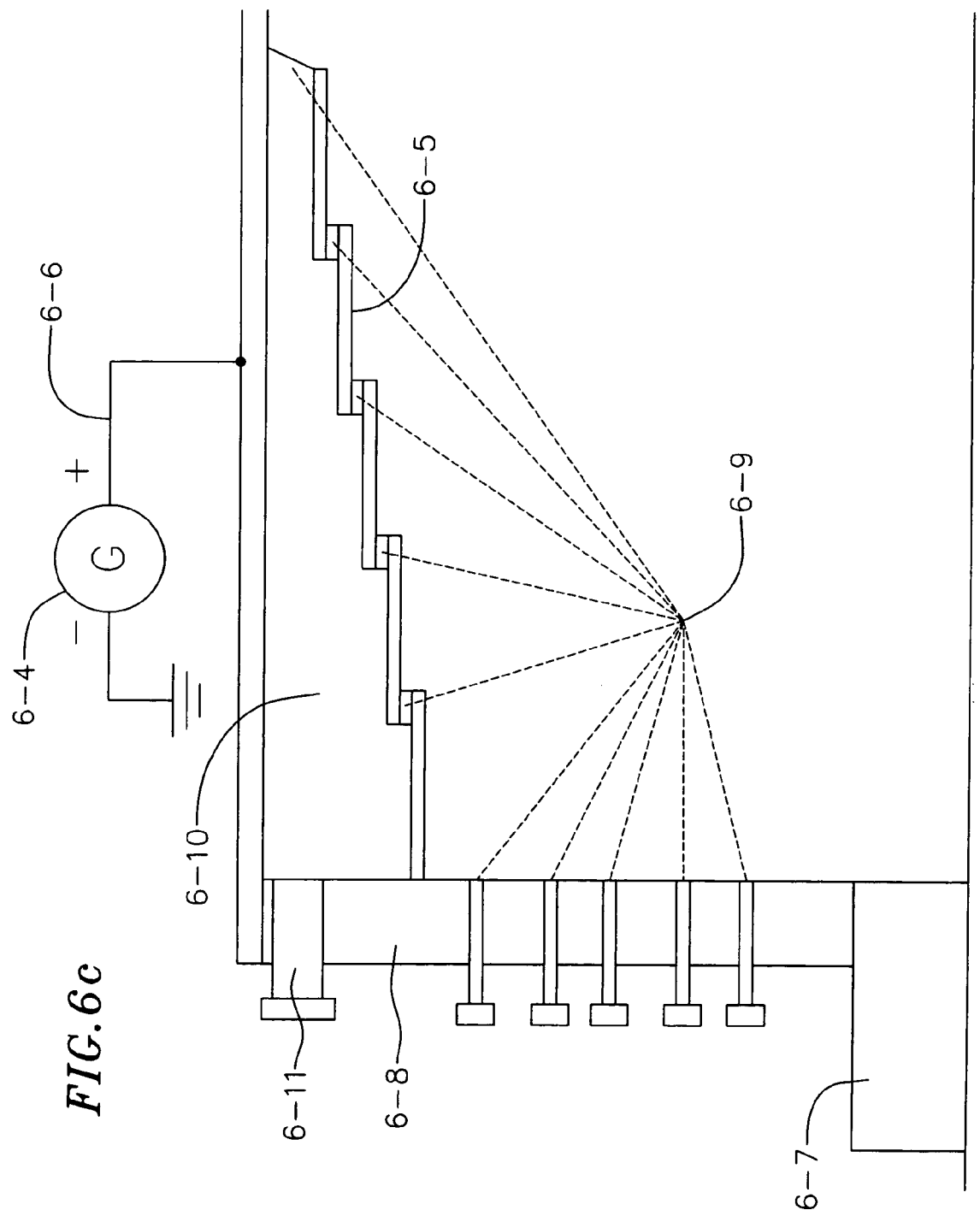
FIG. 6c shows a schematic of another exemplary configuration of the combustion chamber in accordance with the particle generator of the current invention.

FIG. 6c shows the area of the combustion chamber wall at the transition of the cylindrical combustion chamber and the adapter fitting (6-8) where the burner (6-7) is arranged. In the embodiment shown, the combustion chamber is shaped as a hollow cylinder. Several hollow cylinders are arranged inside each other. The hollow cylinders overlap each other at their ends and are connected via welding, flanges or screwing. The crack between the hollow cylinders serves as the "chamber wall gas" supply. In addition, a gas layer is formed on the surface of the wall and protects the wall against thermal damage and reactive particles.

In embodiments of the invention where accelerating the ionized nanoparticles is important, the tapered stricture (6-2) may be connected with an acceleration channel through a flange (6-3). In such an embodiment, a high voltage generator (6-4) is connected with the combustion chamber wall (6-5) via an electrical connector (6-6). The whole combustion chamber can also be connected to the high voltage generator.

Figure 7A:
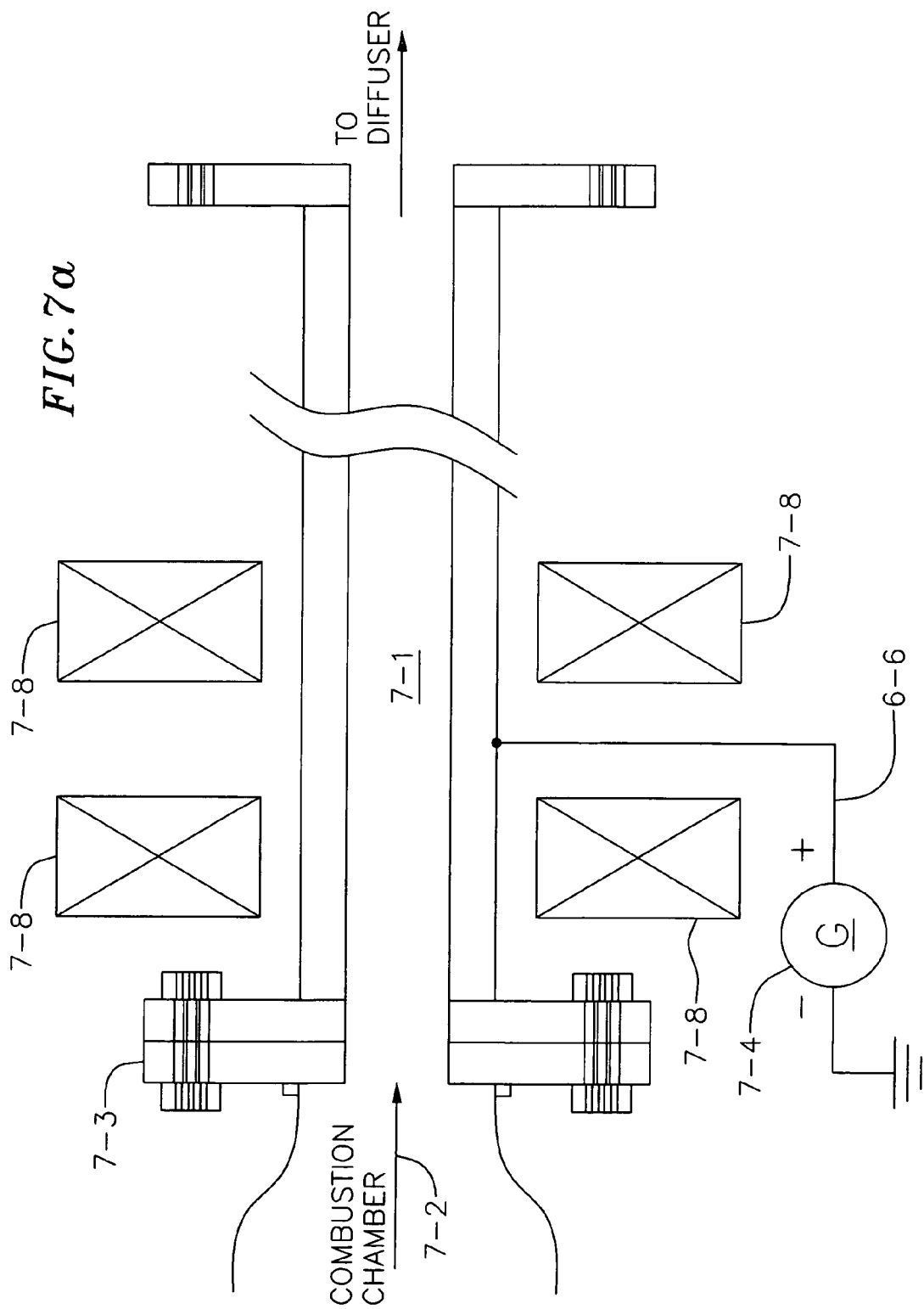
FIG. 7a shows a schematic of an exemplary configuration of an acceleration channel in accordance with the particle generator of the current invention.

FIG. 7a shows a detailed view of the optional acceleration channel (7-1) in accordance with one embodiment of this invention. The channel is attached to the combustion chamber (7-2) via welding, screwing or flanges. FIG. 7a shows as an example of a connection via a flange (7-3). The acceleration channel (7-1) is connected to one or several generators (7-4), which apply a positive potential. The length of the channel can be chosen without limit, depending on the operator's choice of how long the electric field should influence the gas-solid stream. The acceleration channel could be manufactured out of electrically conducting, high-temperature material, e.g., steel or tungsten. In one embodiment it is possible to increase the ionization rate of the nanoparticles by increasing the potential, thereby separating electrons out of the gas-solid stream even inside the acceleration channel and increasing the electrostatic repulsive Coulomb-forces. In another embodiment of this invention the acceleration channel is coated with dielectric material. In another embodiment of the invention, permanent magnets or electromagnets (7-5) are arranged around the acceleration channel. The magnetic field leads to circular or spiral movements of the free electron inside the channel which increases the number of impacts of electrons with the molecules or solid particles of the gas stream further increasing the total ionization.

Figure 7B:
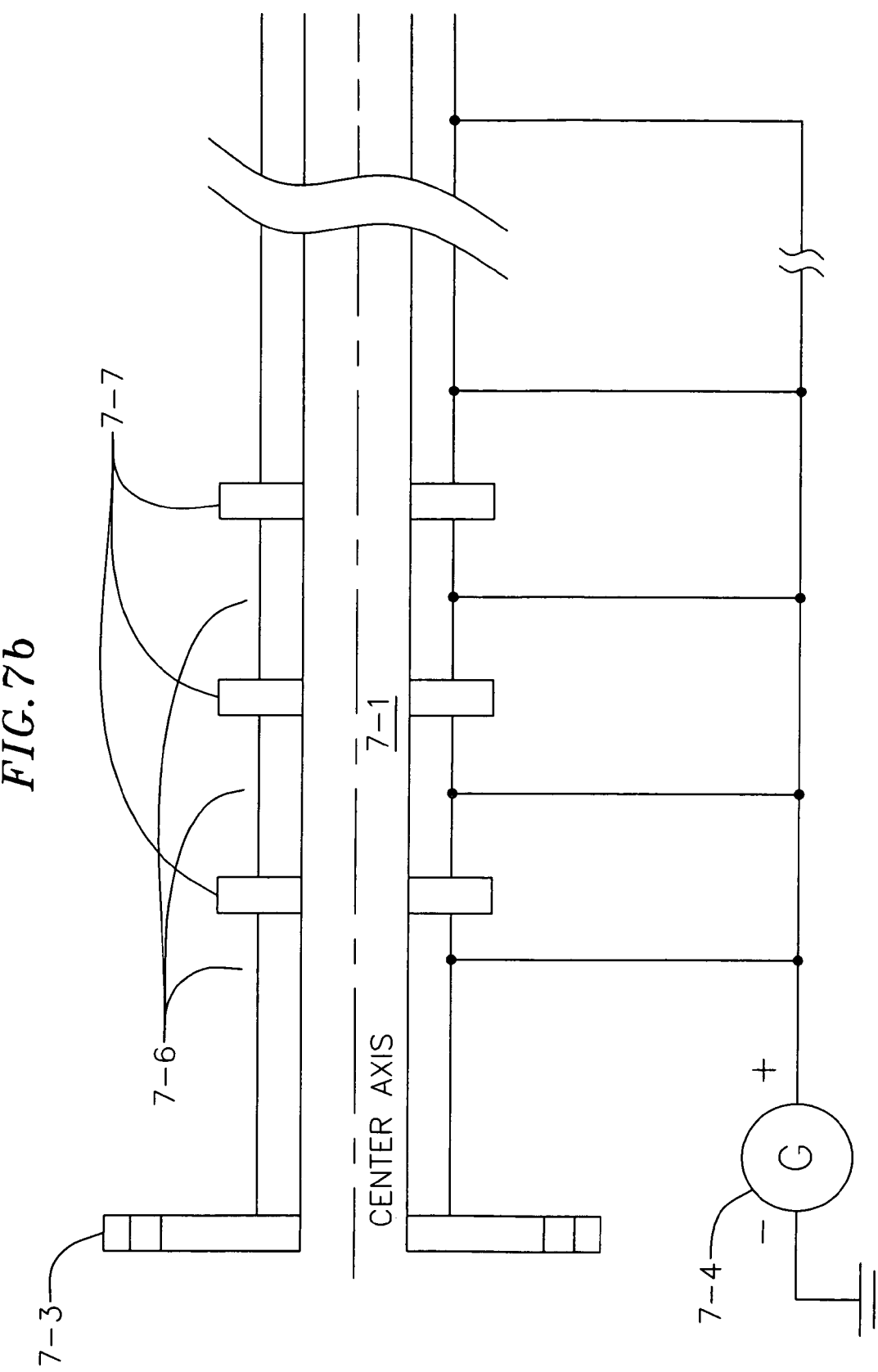
FIG. 7b shows a schematic of another exemplary configuration of an acceleration channel in accordance with the particle generator of the current invention.

A second embodiment of an acceleration channel (7-1) is shown in FIG. 7b. Segments (7-6) of the acceleration channel are electrically disjointed by isolators (7-7) and arranged symmetrically along a central axis. In this embodiment all segments are connected to one generator, but it is also possible to provide several generators without limiting the invention. The generators could be joined with single segments or even segment groups. In a further embodiment of this invention permanent magnets or electromagnets could be arranged around the acceleration channel (7-1). The magnets are not shown in FIG. 7b.

Figure 7C:
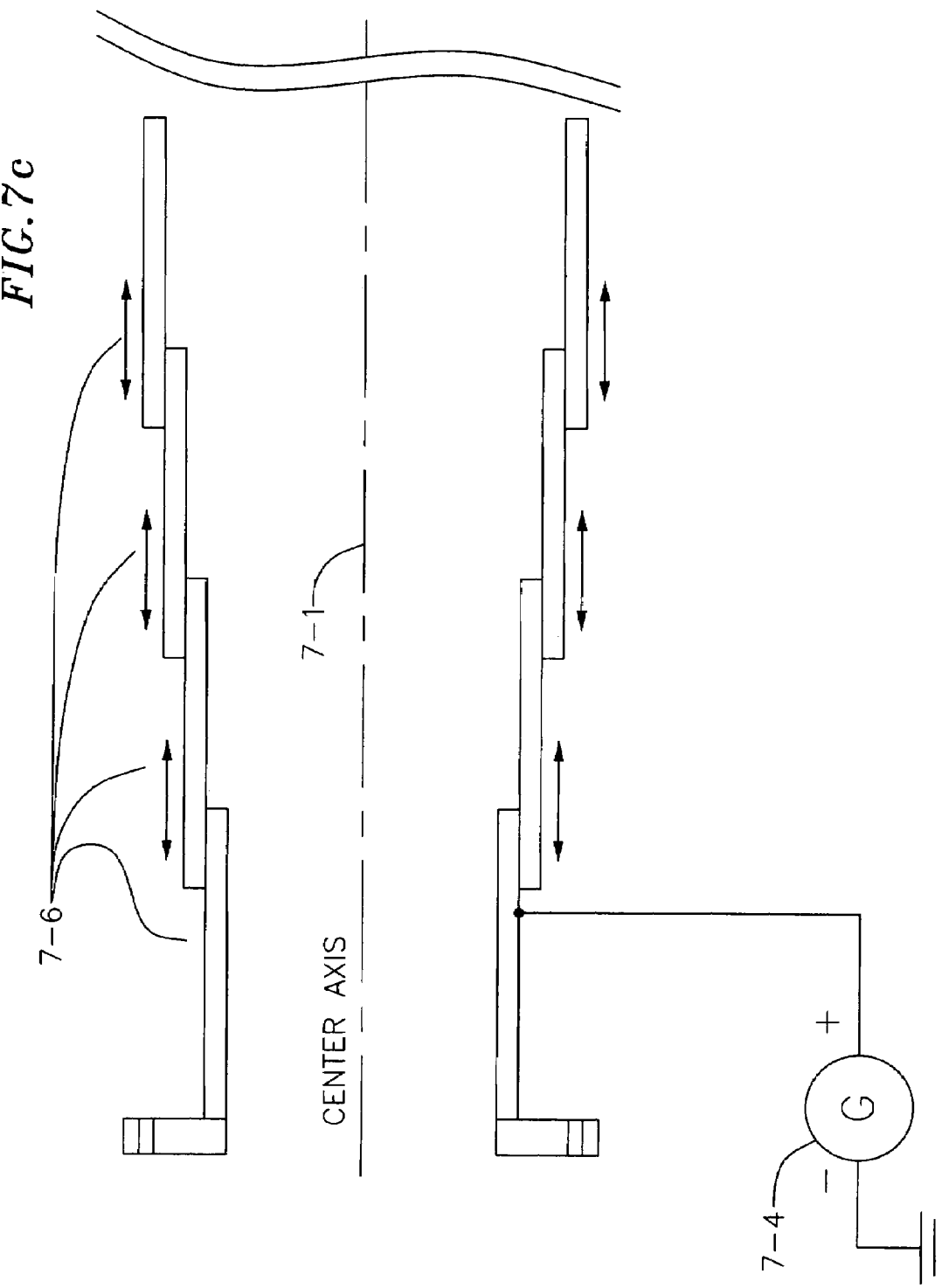
FIG. 7c shows a schematic of yet another exemplary configuration of an acceleration channel in accordance with the particle generator of the current invention.

A further embodiment of the acceleration channel is shown in FIG. 7c. The segments (7-6) of the acceleration channel (7-1) have a telescopic movable arrangement. The arrows in FIG. 7c show the mechanical adjustment units schematically. This embodiment allows for the length of the acceleration channel to be adjusted. In addition to telescopic movable arrangements there could be mutual outer or inner tubes. The diameter of the acceleration channel, as shown in FIGS. 7a-c, is homogenous, but it could also be designed to controllably narrow or expand. By controlling the length or size of the acceleration channel the potential applied to the ionized nanoparticles can also be controlled.

Although ionization only in an accelerator is discussed above, it should be understood that a separate ionization source may be positioned anywhere on the device to increase the ionization of nanoparticles. In one example, an ionizer capable of applying an ionizing energy to the nanoparticles is positioned in the combustion chamber. In such an embodiment any suitable ionization source may be used, such as, for example, an electron bombardment source, a microwave source, an (vacuum) ultraviolet source, or a (high frequency) HF-inductor.

The invention is described in more detail using the following exemplary embodiments:

Propulsion Source

Although the current invention is generally directed to a nanoparticle generator, in one exemplary embodiment the ionized nanoparticles produced can be used as a variable propulsion source. Comparing this invention with the state of the art shows that the advantage of this device is that depending on the situation a variable thrust, alternatively a variable specific impulse, is provided. For example, the interplanetary travel time of spacecraft might be reduced because it is possible to choose between a high acceleration, which is needed at pivot or deceleration maneuvers, and high output velocities, which is preferable to reduce the time of space travel. This is possible because the device offers a variation in the acceleration and velocity parameters.

Figure 8:
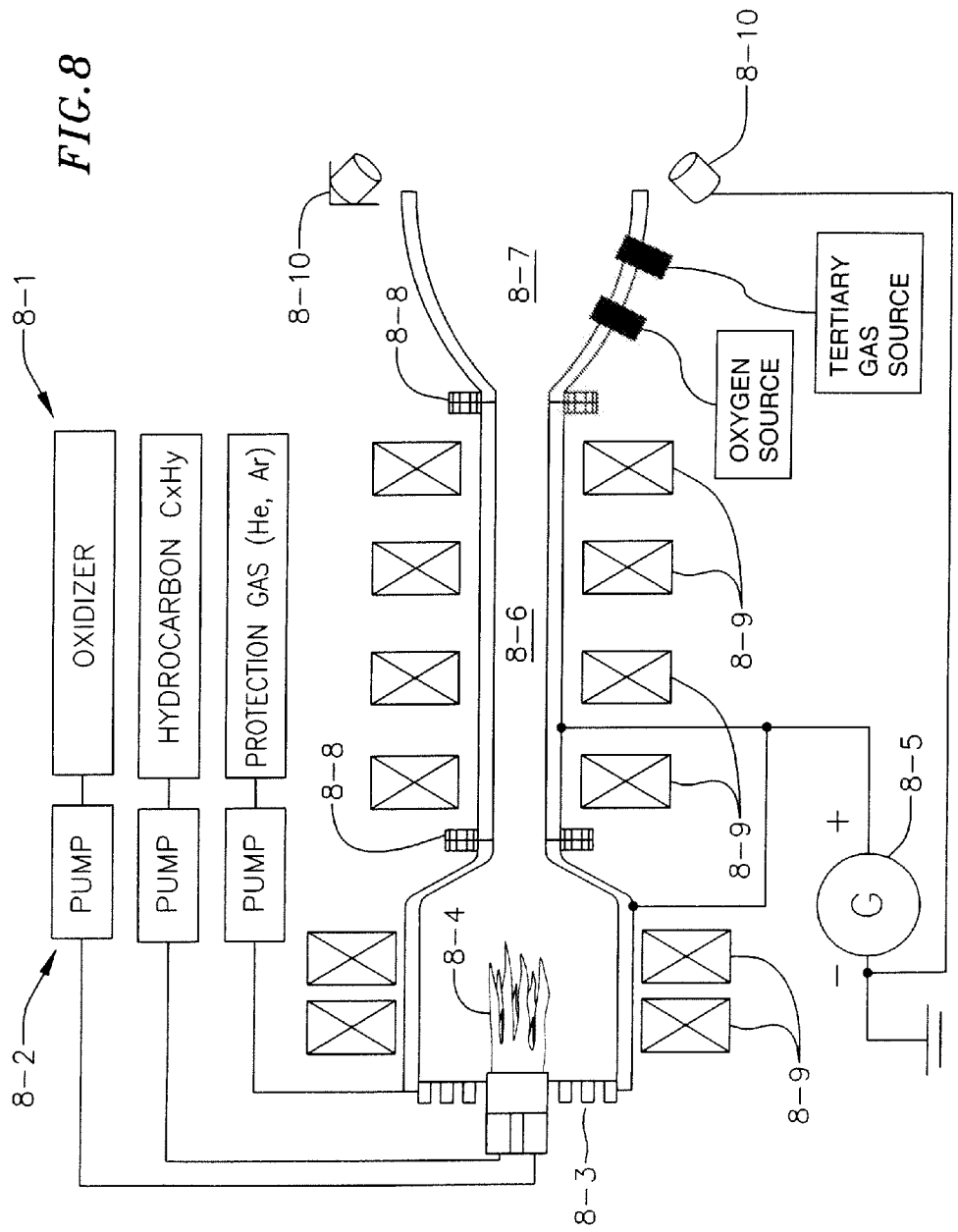
FIG. 8 shows a schematic of an exemplary embodiment of a plasma propulsion system according to the present invention.

FIG. 8 shows a schematic of an electro-thermal propulsion system in accordance with the current invention. A supporting system contains storage tanks (8-1) and a metering and pumping system (8-2). The liquid or gaseous fuel, an oxidizer and the "chamber wall gas" are piped through pipes to the burner system (8-3) and the combustion chamber (8-4). A positive potential is applied to the combustion chamber (8-4) via a high voltage generator (8-5). Inside the combustion chamber (8-4), the fuel is oxidized under conditions that lead to the formation of solid nanoparticles of specified diameter, mass and charge, as previously discussed.

During combustion, the precursors and/or products exist in highly vibratory excited states. Therefore, the energy difference of the precursor and/or the product to the ionization energy is much lower than in the ground state. Some of the precursors and/or products exist mainly in an ionized state, for example $OH^-$, $CH_3^+$ and soot (most commonly single positive charged). The high voltage that is applied to the combustion chamber wall and the acceleration channel (8-6) further unhinges electrons out of the neutral atoms or molecules. The negatively charged particles ($OH^-$) and the free electrons move toward the positive charged chamber wall. To prevent the impact of $OH^-$ on the chamber wall, and therefore prevent a damage of the chamber wall due to a chemical reaction, a "chamber wall gas" is introduced. Preferably hydrogen or methane is used as "chamber wall gases" because of the very fast reaction velocity of $OH^-$ with those compounds and the formation of water.

A hot, partially ionized combined gas-solid exhaust gas stream leaves the combustion chamber (8-4) and enters the acceleration channel (8-6). The combustion chamber and the acceleration channel are connected via flanges, welded connections or threads. The acceleration channel (8-6) has a diameter that is preferably smaller than that of the combustion chamber (8-4). Due to the electric field, the partial ionized gas-solid stream is accelerated towards the diffuser (8-7), which may be connected via flanges, welded connections or threads. The gas-solid stream leaves the diffuser (8-7) out to free space providing the thrust.

To prevent a charging of the air-/spacecraft there is at least one passive or active electron emitter (8-10) provided, which is arranged near or around the diffuser (8-7). Maximal velocity of the exhaust gas including the positively charged carbon- or carbon/metal-nanoparticles should be achieved. The ejected electrons should recombine with the cations a safe distance behind the accelerating spacecraft. Therefore, the emitted electron beam and the positively charged exhaust gas should be arranged parallel with respect to each other.

FIG. 8 shows schematically an active electron emitter (8-10). In another embodiment of the invention there are permanent magnets or electromagnets arranged around the combustion chamber (8-4) and/or around the acceleration channel (8-6), such that electrons, which have been emitted via the electron emitter (8-10), move inside the acceleration channel on circular or spiral paths. This movement leads to further impact of the electrons with the exhaust gas and increases the total degree of ionization.

Plasma Source

Although the use of a plasma for providing thrust to a spacecraft is described above, it should be understood that a plasma source in accordance with the current invention could be used in a variety of applications.

For example, in one embodiment, the nanoparticle generator is designed to provide a plasma, which can then be used as a plasma welder. In such an embodiment, the recombination of cationic nanoparticles and electrons should be right on the spot, which is being welded. The charge recombination will locally produce a great deal of heat, which can be used to melt and weld metal objects. In general, the kinetic energy of the particles ($E=mv^2$) grows faster with increasing velocity than with their mass. However, it must be noted that the vibrational energy of a very hot carbon-cluster adds to the total amount of impacting energy. Consequently, an optimum velocity of the impacting nanoparticles and a maximum temperature of the exhaust are suggested in order to maximize the energy of the impacting particles. Furthermore, the exhaust must be concentrated within a small region, where the welding should take place. Therefore, the nozzle should be formed as a cylinder not a cone, which would allow the pressure of the exhaust gas to drop to near vacuum conditions.

It should also be understood that the nature of the nanoparticles themselves will effect the efficacy of a plasma welder in accordance with the current invention. For example, if the carbon/metal nanoparticles are very rich in their metal-content, the process of welding is favored. In contrast, high metal-oxide content favors the separation of metal-parts during welding.

In another embodiment, the nanoparticle generator of the current invention may be used as a plasma torch. The working conditions of the plasma-generator are principally very similar to the plasma-torch. Typical working conditions of a plasma-torch depend on the type of use to which the plasma is being put. For example, if projection of the plasma is desired, the operation of the torch will generally be limited to the vacuum of space, because the emitted electron-beam is readily absorbed/weakened in any dense atmosphere. The key to projection of a plasma is in the angle between the emitted electron beam and the focused exhaust containing positively charged nanoparticles. This angle must be as large as possible, depending on the geometric extensions of the target. This will impose a strong electrical field on/within the target, which will a) hamper all electronics on board and b) generate extreme local heating on/in the target, which will eventually lead to its destruction.

In contrast, a nanoparticle plasma stream may also be used in a contained area to eliminate pollutants or other solid waste materials, such as household or industrial waste. Some exemplary pollutants include, for example, very stable (recalcitrant) organic molecules (for instance: dibenzo-dioxines, dibenzofuranes, perhalogenated aromatic compounds and many others). The working conditions differ from the other plasma uses in the following ways: a) operation should maximize the production of smaller but more numerous carbon-particles and b) a maximal number of collisions between the pollutants and the carbon-particles. Therefore, the accelerator should be designed distinctly longer, but the accelerating voltage will be smaller than in the case of the plasma-engine. The energy conversion from the positively charged carbon-nanoparticles to the pollutants should be maximal. Instead of a nozzle, a recombination chamber is provided in which the cations and electrons recombine. In this chamber, a stoichiometric amount of oxygen will be introduced in order to ensure the complete mineralization of the pollutants and the carbon-nanoparticles as well. The thermal energy produced from the reactions can then optionally be used to produce steam in chemical factories.

Speciality Nanomaterials

In yet another embodiment, the nanoparticle generator of the current invention may be used to create novel nanomaterials. For example, in one embodiment the nanoparticle generator may be used to create heavy metal/carbon nanoparticles. Two exemplary approaches to such an embodiment are provided below.

In a first embodiment, the wall material of the combustion chamber or a collision-sheet are made of a main group, d-block or f-block metal, or an alloy of at least two metals. Due to the extreme heat and abrasion within the plasma-chamber, the metal (or metal alloy) evaporates into the plasma-chamber. Then, ionization and incorporation occurs into rather defined $C_xH_yMe_z$-clusters or $C_xH_yMe_{1z1}Me_{2z2}...$_clusters (Me=metal). This approach has the advantage of greater flexibility for the metal composition, and the cooling system (or at least a part of the cooling system) could be saved.

In a second embodiment, a main group, d-block, or f-block metal (as conventionally defined in the periodic table) can be employed as separate chemical substances, which can be evaporated relatively easy (at T<800° C.). The metal-containing vapor is then introduced into the plasma-chamber where ionization and then incorporation into metal-containing carbon clusters occurs. Examples of chemical substances, which contain these metals, and which can be relatively easy evaporated are: metal(0)-carbonyls; metallocenes and their derivatives and analogues; neutral complexes formed by cationic metal-centers and so-called ligands (Examples for possible ligands are so-called "chelating ligands" such as EDTA; NTA; 2,2'-bipyridine; 1,10-phenanthroline; and the so-called "monodental" ligands, such as cyanide, cyanate, isocyanate, thiocyanate, alkoxides, halides, amides and carboxylates.); metal-salts containing cyanide, cyanate, isocyanate, thiocyanate, alkoxides, halides, amides and carboxylates as anions; metal oxides (such as $Na_2O$) with a relatively low boiling point; metal hydrides with suitable evaporation properties (such as $CaH_2$); suitable metal carbides (such as $CaC_2$); and metal alloys (as for instance with alkaline and alkane earth elements and many amalgames).

There are basically two advantages of incorporating metals into the carbon-clusters (nanoparticles): particles of a heavier mass can be formed, and nanoparticles containing multiple metals with defined size and defined metal content can be formed.

A particular example of the (heavy) metal insertion technique, is the generation of nanocontainers for radiating nuclear waste (Uranium-Isotopes and other elements from the Actinide Series, for example, Neptunium, Plutonium, Americium, etc.). Using this heavy-metal insertion technique it is possible to produce carbon-clusters that contain a very low content of radiating metal (ideally 1 per carbon cluster). The resulting carbon-clusters are chemically very stable and efficiently trap the emitted alpha and beta-radiation. More importantly, clusters of nanoparticles possess large interparticle-volumes and thus allow much better cooling than solid or liquid samples. Furthermore, carbon melts at extremely high temperatures, for example, diamond melts at 3550° C. Although we can expect somewhat lower values for nanoparticles, approximately 2500-3000° C., this is still a substantial improvement over the metal drums and vessels currently used to store radioactive materials. In addition, methane is an extremely cheap source of carbon, which could be easily converted into very valuable nanocontainers. With the help of this particular application of the nanoparticle generator of the current invention, the safe deposition of nuclear waste on the surface of this planet may be achievable.

The elements of the apparatus and the general features of the components are shown and described in relatively simplified and generally symbolic manner. Appropriate structural details and parameters for actual operation are available and known to those skilled in the art with respect to the conventional aspects of the process.

Although specific embodiments are disclosed herein, it is expected that persons skilled in the art can and will design alternative nanoparticle generators that are within the scope of the following claims either literally or under the Doctrine of Equivalents.

The invention claimed is:

1. A particle generator comprising:
   a fuel source for supplying a combustible fuel;
   an oxidizer source for supplying an oxidizer;
   at least one combustion chamber having first and second ends;
   an exhaust port being disposed at the second end of each of said at least one combustion chamber; and
   at least one combustion source disposed within each of said combustion chambers at a first end thereof, in fluid communication with said fuel source and said oxidizer source, where said combustion source supports stable flame combustion of said fuel at an air demand ratio ($\lambda$) is $\lambda>0.5$;
   at least one tunable high voltage generator for applying a positive voltage to walls of the combustion chamber to extract electrons out of the flame and promote the formation of particles, such that an exhaust of particles is generated;
   where the temperature and air demand ratio of the combustion source, the retention time of the exhaust within the combustion chamber, and/or the applied positive voltage are varied to control the mass of the particles output from said particle generator.

2. A particle generator comprising:
   a fuel source for supplying a combustible fuel;
   an oxidizer source for supplying an oxidizer;
   at least one combustion chamber having first and second ends;
   an exhaust port being disposed at the second end of each of said at least one combustion chamber;
   at least one combustion source disposed within each of said combustion chambers at a first end thereof, in fluid communication with said fuel source and said oxidizer source, where said combustion source supports stable flame combustion of said fuel in the domain where an air demand ratio ($\lambda$) is $\lambda>0.5$ such that an exhaust of particles is generated, and where the temperature and air demand ratio of the combustion source and the retention time of the exhaust within the combustion chamber are varied to control the mass of the particles output from said particle generator; and
   a secondary fuel source in fluid communication with said combustion chamber, wherein the secondary fuel source is disposed to deliver a pyrolysis fuel comprising at least one high molecular mass hydrocarbon into the exhaust of particles generated by the burner.

3. The particle generator described in claim 2, wherein the pyrolysis fuel is gasoline, diesel or fuel oil.

4. The particle generator described in claim 1, wherein the temperature of the combustion may be varied from around 1000 K to around 2500 K.

5. The particle generator described in claim 1, wherein the air demand ratio $\lambda$ is within a range of around 0.5 to around 1.0.

6. The particle generator described in claim 1, wherein the at least one combustion source is a burner selected from the group consisting of swirl, diffusion plate, and partially pre-mixed.

7. The particle generator described in claim 6, wherein the at least one combustion source is a swirl burner having a configuration selected from the group consisting of turbulent diffusion and stabilized pressure plate-diffusion.

8. The particle generator described in claim 1, comprising at least two combustion sources disposed within a single combustion chamber.

9. The particle generator described in claim 8, wherein the at least two combustion sources are disposed in an arrangement selected from the group consisting of centric, circular or planar.

10. The particle generator described in claim 1, wherein the fuel from the fuel source is introduced into said combustion chamber via an atomizer.

11. The particle generator described in claim 1, wherein the oxidizer is introduced into said combustion chamber via an air blast nozzle.

12. A particle generator comprising:
a fuel source for supplying a combustible fuel;
an oxidizer source for supplying an oxidizer,
at least one combustion chamber having first and second ends, wherein the oxidizer is introduced into said combustion chamber via an air blast nozzle, and the air blast nozzle is disposed such that it causes the fuel to be swirled within said combustion chamber;
an exhaust port being disposed at the second end of each of said at least one combustion chamber; and
at least one combustion source disposed within each of said combustion chambers at a first end thereof, in fluid communication with said fuel source and said oxidizer source, where said combustion source supports stable flame combustion of said fuel in the domain where an air demand ratio ($\lambda$) is $\lambda > 0.5$ such that an exhaust of particles is generated, and where the temperature and air demand ratio of the combustion source and the retention time of the exhaust within the combustion chamber are varied to control the mass of the particles output from said particle generator.

13. A particle generator comprising:
a fuel source for supplying a combustible fuel;
an oxidizer source for supplying an oxidizer;
at least one combustion chamber having first and second ends;
an exhaust port being disposed at the second end of each of said at least one combustion chamber;
at least one combustion source disposed within each of said combustion chambers at a first end thereof, in fluid communication with said fuel source and said oxidizer source, where said combustion source supports stable flame combustion of said fuel in the domain where an air demand ratio ($\lambda$) is $\lambda > 0.5$ such that an exhaust of particles is generated, and where the temperature and air demand ratio of the combustion source and the retention time of the exhaust within the combustion chamber are varied to control the mass of the particles output from said particle generator; and
at least one accelerator itself comprising an elongated channel having first and second ends, wherein the first end of the accelerator is in fluid communication with the exhaust port of the combustion chamber, and wherein the accelerator has a variable electric field applied thereto such that ionized particles entering the first end of the accelerator are accelerated therefrom via the variable electric field.

14. The particle generator described in claim 13, wherein the electric field is generated by a tunable high voltage generator.

15. The particle generator described in claim 13, wherein the accelerator is equipped with at least one magnet concentrically arranged around said elongated channel, said at least one magnet being selected from the group of permanent magnets or electromagnets.

16. The particle generator described in claim 13, wherein the length and diameter of the elongated channel is variable.

17. The particle generator described in claim 16, wherein the elongated channel of the accelerator is formed of several concentric cylinders, which can be telescopically moved with respect to each other to vary the length and diameter of the elongated channel.

18. The particle generator described in claim 13, wherein the accelerator is made of a material selected from an electrically conducting high temperature material.

19. The particle generator described in claim 18, wherein the material is selected from the group consisting of steel and tungsten.

20. The particle generator described in claim 13, wherein the accelerator is coated with a dielectric material.

21. The particle generator described in claim 13, wherein the accelerator is made of at least two segments that are separated by means of electrical insulators.

22. The particle generator described in claim 13, wherein the at least two segments are powered by different high voltage generators.

23. The particle generator described in claim 13, further comprising at least one passive or active electron emitter disposed at the second end of the accelerator.

24. A particle generator comprising:
a fuel source for supplying a combustible fuel:
an oxidizer source for supplying an oxidizer:
at least one combustion chamber having first and second ends:
an exhaust port being disposed at the second end of each of said at least one combustion chamber;
at least one combustion source disposed within each of said combustion chambers at a first end thereof, in fluid communication with said fuel source and said oxidizer source, where said combustion source supports stable flame combustion of said fuel in the domain where an air demand ratio ($\lambda$) is $\lambda > 0.5$ such that an exhaust of particles is generated, and where the temperature and air demand ratio of the combustion source and the retention time of the exhaust within the combustion chamber are varied to control the mass of the particles output from said particle generator; and
a wall gas source in fluid communication with said combustion chamber, said wall gas being injected into said combustion chamber by at least one injector designed to flow said wall gas along the walls of said combustion chamber.

25. The particle generator described in claim 24, wherein the at least one injector is selected from the group consisting of slits, (nanoscopic, or microscopic holes), splits or tubes.

26. The particle generator described in claim 24, wherein the at least one combustion chamber is designed in the shape of several concentric cylinders, such that the wall gas is guided from the wall gas source through the interstice between the cylinders through the at least one injector into the combustion chamber.

27. The particle generator described in claim 24, wherein the wall gas is selected from the group consisting of hydrogen ($H_2$), methane ($CH_4$) or another hydrocarbon of the formula $C_xH_y$, nitrogen ($N_2$) or a noble gas.

28. A particle generator comprising:
a fuel source for supplying a combustible fuel;
an oxidizer source for suppling an oxidizer;
at least one combustion chamber having first and second ends;
an exhaust port being disposed at the second end of each of said at least one combustion chamber;
at least one combustion source disposed within each of said combustion chambers at a first end thereof, in fluid communication with said fuel source and said oxidizer source, where said combustion source supports stable flame combustion of said fuel in the domain where an air demand ratio ($\lambda$) is $\lambda>0.5$ such that an exhaust of particles is generated, and where the temperature and air demand ratio of the combustion source and the retention time of the exhaust within the combustion chamber are varied to control the mass of the particles output from said particle generator; and
a particle ionizer capable of applying an ionizing energy to the particles in the combustion chamber selected from the group consisting of an electron bombardment source, a microwave source, a ultraviolet source, or an HF-inductor.

29. The particle generator described in claim 13, further comprising a particle ionizer capable of applying an ionizing energy to the nanoparticles in the accelerator selected from the group consisting of an electron bombardment source, a microwave source, a ultraviolet source, or an HF-inductor.

30. The particle generator described in claim 23, further comprising a diffuser disposed at the second end of the accelerator; and
wherein the angle of the particle exhaust and the electron emission are parallel such that the electrons and the particles recombine behind the generator.

31. The particle generator described in claim 30, wherein the particle generator is designed for use as a propulsion source within a spacecraft.

32. The particle generator described in claim 23, wherein the second end of the accelerator is formed as a cylinder, and wherein the angle between the particle exhaust and the electron emission may be varied to allow the recombination of the electrons and the particles to be focused at a single point.

33. The particle generator described in claim 32, wherein the particle generator is designed for use as a plasma welder.

34. The particle generator described in claim 23, further comprising a recombination chamber disposed at the second end of the accelerator;
a tertiary gas inlet in fluid communication with said recombination chamber; and
an oxygen source in fluid communication with said recombination chamber, wherein the electrons and the particles recombine within the recombination chamber thereby heating the mixture of the tertiary gas and oxygen within the chamber.

35. The particle generator described in claim 34, wherein the particle generator is designed for use as a plasma torch for incinerating pollutants or other solid wastes.

36. A particle generator comprising:
a fuel source for supplying a combustible fuel;
an oxidizer source for supplying an oxidizer;
at least one combustion chamber having first and second ends;
an exhaust port being disposed at the second end of each of said at least one combustion chamber;
at least one combustion source disposed within each of said combustion chambers at a first end thereof, in fluid communication with said fuel source and said oxidizer source, wherein said combustion source supports stable flame combustion of said fuel in the domain where an air demand ratio ($\lambda$) is $\lambda>0.5$ such that an exhaust of particles is generated, wherein the temperature and air demand ratio of the combustion source and the retention time of the exhaust within the combustion chamber are varied to control the mass of the particles output from said particle generator, and wherein a heavy metal is disposed within the combustion chamber such that the heavy metal evaporates during combustion.

37. The particle generator described in claim 36, wherein the heavy metal is incorporated into the walls of the combustion chamber.

38. The particle generator described in claim 36, wherein the heavy metal is selected from the group of a main group metal, a d-block metal, a main group f-block metal, or an alloy thereof.

39. A particle generator comprising:
a fuel source for supplying a combustible fuel;
an oxidizer source for supplying an oxidizer;
at least one combustion chamber having first and second ends;
an exhaust port being disposed at the second end of each of said at least one combustion chamber;
at least one combustion source disposed within each of said combustion chambers at a first end thereof, in fluid communication with said fuel source and said oxidizer source, wherein said combustion source supports stable flame combustion of said fuel in the domain where an air demand ratio ($\lambda$) is $\lambda>0.5$ such that an exhaust of particles is generated, wherein the temperature and air demand ratio of the combustion source and the retention time of the exhaust within the combustion chamber are varied to control the mass of the particles output from said particle generator; and
a heavy metal source in fluid communication with said combustion chamber for introducing a heavy metal containing vapor thereto during combustion.

40. The particle generator described in claim 39, wherein the heavy metal is selected from the group of a main group metal, a d-block metal, a main group f-block metal, or an alloy thereof.

41. A method of controllably forming particles comprising the steps of:
introducing a fuel and an oxidizer at an air demand ratio of around $\lambda>0.5$ in a combustion chamber;
combusting the fuel and oxidizer in the combustion chamber at a temperature from around 1000 K to around 2500 K for a retention time of at least one millisecond; and
applying an electric potential to extract electrons; and
varying the temperature, the air demand ratio, the electric potential, and/or the retention time to produce an exhaust comprising particles having a controlled mass.

42. A method of controllably forming particles comprising:
introducing a fuel and an oxidizer at an air demand ratio of around $\lambda>0.5$ in a combustion chamber;
combusting the fuel and oxidizer in the combustion chamber at a temperature from around 1000 K to around 2500 K for a retention time of at least one millisecond;
varying the temperature, the air demand ratio and the retention time to produce an exhaust comprising particles having a controlled mass, wherein the step of combusting uses a stabilized diffusion flame burner.

43. The method described in claim 41, wherein the step of combusting uses a swirl flame burner.

44. The method described in claim 41, further comprising the step of: introducing a "wall-gas" into the combustion chamber to protect the walls of the combustion chamber.

45. A method of controllably forming particles comprising:
introducing a fuel and an oxidizer at an air demand ratio of around $\lambda>0.5$ in a combustion chamber;
combusting the fuel and oxidizer in the combustion chamber at a temperature from around 1000 K to around 2500 K for a retention time of at least one millisecond;
varying the temperature, the air demand ratio and the retention time to produce an exhaust comprising particles having a controlled mass; and
applying an electrical field to accelerated ionized particles.

46. A method of controllably forming particles comprising:
introducing a fuel and an oxidizer at an air demand ratio of around $\lambda>0.5$ in a combustion chamber;
combusting the fuel and oxidizer in the combustion chamber at a temperature from around 1000 K to around 2500 K for a retention time of at least one millisecond;
varying the temperature, the air demand ratio and the retention time to produce an exhaust comprising particles having a controlled mass; and
introducing a second high molecular weight fuel to the combustion.

47. A method of controllably forming particles comprising:
introducing a fuel and an oxidizer at an air demand ratio of around $\lambda>0.5$ in a combustion chamber;
combusting the fuel and oxidizer in the combustion chamber at a temperature from around 1000 K to around 2500 K for a retention time of at least one millisecond;
varying the temperature, the air demand ratio and the retention time to produce an exhaust comprising particles having a controlled mass; and
bombarding ionized particles with a stream of electrons to neutralize the particles.

48. A method of controllably forming particles comprising:
introducing a fuel and an oxidizer at an air demand ratio of around $\lambda>0.5$ in a combustion chamber;
combusting the fuel and oxidizer in the combustion chamber at a temperature from around 1000 K to around 2500 K for a retention time of at least one millisecond;
varying the temperature, the air demand ratio and the retention time to produce an exhaust comprising particles having a controlled mass; and
introducing a heavy metal into the combustion.

49. The method described in claim 48, wherein the heavy metal is selected from the group consisting of a main group metal, a d-block metal, a main group f-block metal, or an alloy thereof.

\* \* \* \* \*